US012698218B2

(12) United States Patent
Hoff

(10) Patent No.: US 12,698,218 B2
(45) Date of Patent: Aug. 4, 2026

(54) WATER DISTILLER

(71) Applicant: GROASIS IP B.V., Steenbergen (NL)

(72) Inventor: Petrus Mattheus Maria Hoff, Steenbergen (NL)

(73) Assignee: Groasis IP B.V., Steenbergen (NL)

( * ) Notice: Subject to any disclaimer, the term of this patent is extended or adjusted under 35 U.S.C. 154(b) by 0 days.

(21) Appl. No.: 17/914,457

(22) PCT Filed: Mar. 25, 2021

(86) PCT No.: PCT/EP2021/057722
§ 371 (c)(1),
(2) Date: Sep. 26, 2022

(87) PCT Pub. No.: WO2021/191341
PCT Pub. Date: Sep. 30, 2021

(65) Prior Publication Data
US 2024/0002259 A1 Jan. 4, 2024

(30) Foreign Application Priority Data
Mar. 26, 2020 (EP) .................................... 20165994

(51) Int. Cl.
*C02F 1/14* (2023.01)
*B01D 1/00* (2006.01)
*B01D 5/00* (2006.01)

(52) U.S. Cl.
CPC .............. *C02F 1/14* (2013.01); *B01D 1/0017* (2013.01); *B01D 1/0035* (2013.01);
(Continued)

(58) Field of Classification Search
CPC ................................. C02F 1/14; B01D 5/0066
See application file for complete search history.

(56) References Cited

U.S. PATENT DOCUMENTS 1,812,516 A * 6/1931 Dooley ..................... C02F 1/14
203/DIG. 17
2,402,737 A * 6/1946 Delano ..................... C02F 1/18
203/DIG. 1
(Continued)

FOREIGN PATENT DOCUMENTS

EP 1891275 2/2008
GB 1412971 A 11/1975
(Continued)

OTHER PUBLICATIONS

"Porous." Merriam-Webster.com Dictionary, Merriam-Webster, https://www.merriam-webster.com/dictionary/porous. Accessed Sep. 18, 2025.*
(Continued)

*Primary Examiner* — Jonathan Luke Pilcher
(74) *Attorney, Agent, or Firm* — Benjamin D. Van Der Sman; Hoyng Rokh Monegier B.V.

(57) ABSTRACT
A water distiller for distilling contaminated water is disclosed, the water distiller comprising a first container, for containing contaminated water, the first container comprising a first base and a first wall, upwardly extending from the first base, an outer cover, a water collection unit, preferably an outer container, and an inner cover for enclosing a volume in the first container, which inner cover comprises at least one aperture and is positioned below the outer cover, wherein the inner and outer cover are designed for transporting condensed water to the water collection unit, preferably an outer container, and wherein the outer cover is transparent for heating the contaminated water in the first container by sun. The invention also relates to a method for distilling water, to specifically shaped outer covers and/or inner covers and their use in distilling contaminated water.

18 Claims, 7 Drawing Sheets

(52) U.S. Cl.
CPC ........... B01D 5/0018 (2013.01); B01D 5/006 (2013.01); B01D 5/009 (2013.01)

(56) References Cited

U.S. PATENT DOCUMENTS

| | | | | |
|---|---|---|---|---|
| 2,405,877 A * | 8/1946 | Delano | ...................... | C02F 1/14 203/DIG. 1 |
| 3,314,862 A * | 4/1967 | Hay | .......................... | C02F 1/14 203/DIG. 1 |
| 3,357,897 A * | 12/1967 | Salzer | ....................... | C02F 1/14 202/83 |
| 3,397,117 A * | 8/1968 | Smith | ....................... | B63C 9/06 52/2.21 |
| 3,415,719 A * | 12/1968 | Telkes | ....................... | C02F 1/14 159/904 |
| 3,455,790 A * | 7/1969 | Marks | ....................... | C02F 1/14 202/202 |
| 3,501,381 A * | 3/1970 | Delano | ................ | B01D 1/0005 202/83 |
| 3,801,474 A * | 4/1974 | Castellucci et al. | ...... | C02F 1/14 261/95 |
| 4,010,080 A * | 3/1977 | Tsay | ........................ | F24S 23/30 202/83 |
| 4,075,063 A * | 2/1978 | Tsay | ..................... | B01D 5/0066 203/DIG. 1 |
| 4,134,393 A * | 1/1979 | Stark | ......................... | C02F 1/14 126/714 |
| 4,194,949 A * | 3/1980 | Stark | ....................... | F24S 23/30 202/180 |
| 4,210,121 A * | 7/1980 | Stark | ....................... | F24S 23/31 136/246 |
| 4,745,707 A | 5/1988 | Newby | | |
| 5,053,110 A * | 10/1991 | Deutsch | .................... | C02F 1/14 203/1 |
| 5,181,991 A * | 1/1993 | Deutsch | ................. | B01D 5/009 202/180 |
| 5,348,622 A * | 9/1994 | Deutsch | .................... | C02F 1/14 203/1 |
| 5,468,351 A | 11/1995 | Hirota et al. | | |
| 6,500,216 B1 * | 12/2002 | Takayasu | ................. | C02F 1/06 23/303 |
| 7,008,515 B1 * | 3/2006 | Husson, Jr. | ............... | C02F 1/14 202/83 |
| 9,259,662 B2 * | 2/2016 | Lee | ....................... | B01D 1/0035 |
| 10,093,552 B2 * | 10/2018 | Lee | ........................... | C02F 1/14 |
| 10,898,825 B2 * | 1/2021 | McClean | ............. | B01D 1/0035 |
| 2006/0081455 A1 * | 4/2006 | Yonover | ................... | C02F 1/14 202/152 |
| 2010/0300946 A1 * | 12/2010 | Nguyen | .................... | A23L 2/08 202/206 |
| 2014/0231327 A1 * | 8/2014 | D'Alba | ................ | B01D 5/0066 210/175 |
| 2016/0136537 A1 * | 5/2016 | McGee | .................. | B01D 5/009 202/188 |

FOREIGN PATENT DOCUMENTS

| | | |
|---|---|---|
| GB | 1497953 A | 1/1978 |
| WO | 2006132526 | 12/2006 |
| WO | 2012081980 | 6/2012 |
| WO | 2016118011 | 7/2016 |

OTHER PUBLICATIONS

"Porous", Cambridge.org Dictionary, Cambridge, https://dictionary.cambridge.org/us/dictionary/english/porous, Accessed Sep. 18, 2025.*
("Porous", The Brittanica Dictionary, Brittanica, https://www.britannica.com/dictionary/porous, Accessed Sep. 18, 2025.*
D. Satas, "Porous Sprayed Sheets and Coatings," Industrial and Engineering Chemistry. vol. 57, Ngo. 4 (Apr. 1965), pp. 38-43.*
Oxford University Press. (n.d.). Intransparent, adj. in Oxford English dictionary. Retrieved Sep. 19, 2025, from https://doi.org/10.1093/OED/6984389897.*
"Intransparent", Wiktionary.org. Feb. 11, 2013 (date obtained from Way Retrieved Sep. 19, 2025, from https://web.archive.org/web/20130211035219/https://en.wiktionary.org/wiki/intransparent.*
Oxford University Press. (n.d.). Translucent, adj., 1.b. in Oxford English dictionary. Retrieved Sep. 19, 2025, from https://doi.org/10.1093/OED/8142287073.*
Meleen, Michele, "Transparent vs. Translucent vs. Opaque Compared", LoveToKnow Media, Oct. 28, 2021, retrieved Sep. 19, 2025 from https://www.yourdictionary.com/articles/transparent-translucent-opaque.*
"What's the Difference Between Transparent, Translucent, and Opaque?", Metropolitan West, Feb. 10, 2023, retrieved Sep. 19, 2025 from https://metwest.com/blog/whats-the-difference-between-transparent-translucent-and-opaque.*
"The GORE-TEX Membrane: What it is, how it works and why you need it", Team Gore, Dec. 3, retrieved Sep. 19, 2025 from https://www.gore-tex.com/blog/the-gore-tex-membrane-what-it-is-how-it-works-and-why-you-need-it.*

* cited by examiner

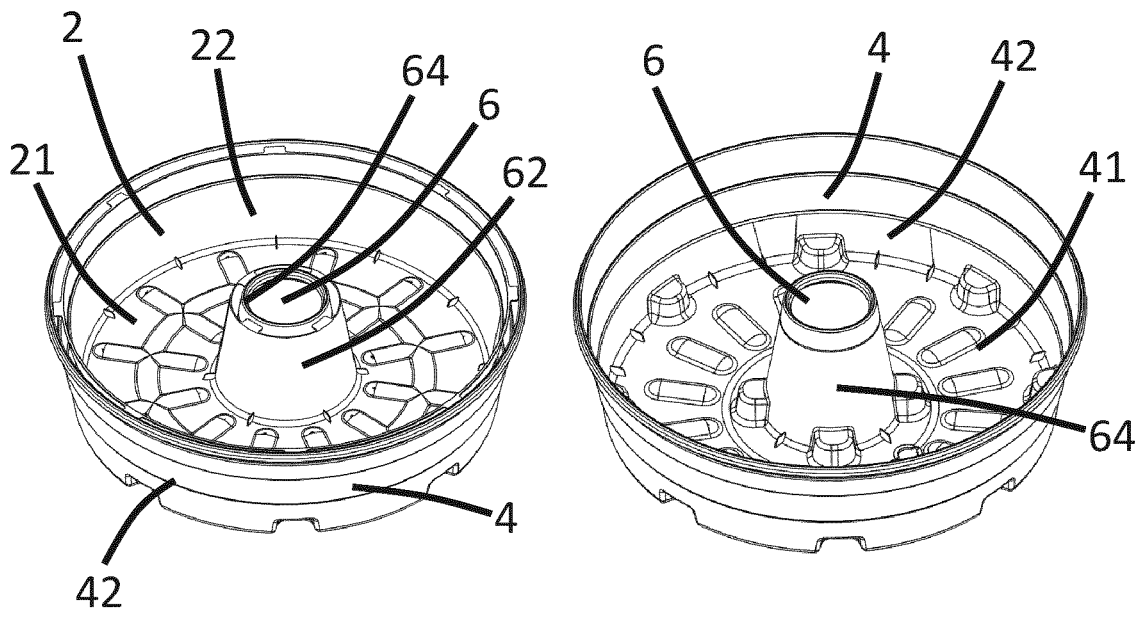
FIG. 3A                    FIG. 3B
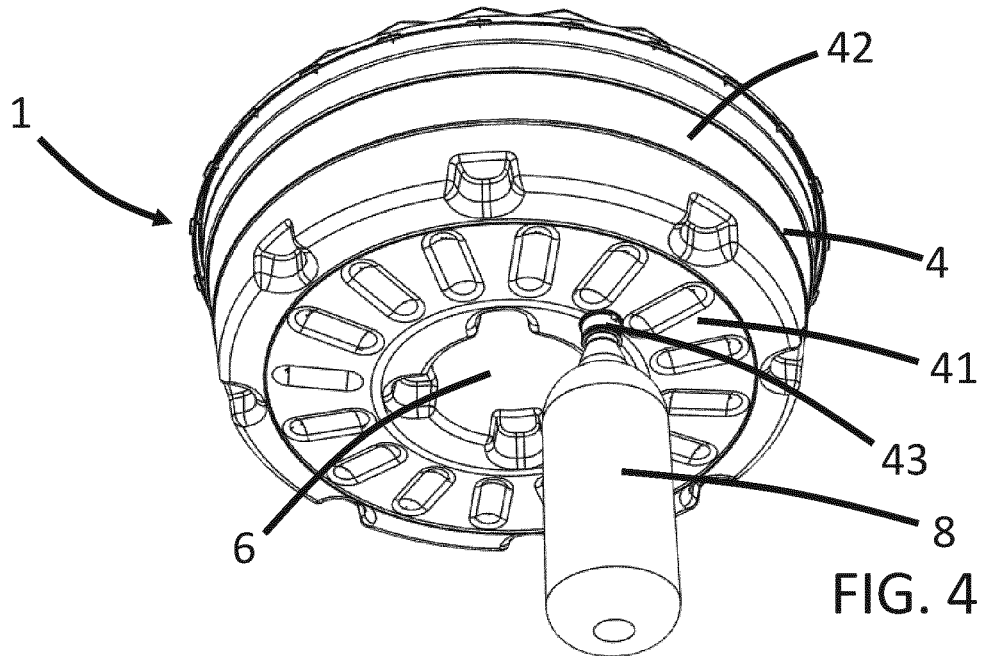
FIG. 4

WATER DISTILLER

BACKGROUND OF THE INVENTION

The present invention relates to a water distiller, in particular a water distiller that can operate by exposure to energy such as e.g. sunlight or wind, for recovering fresh water from contaminated water in an efficient manner without the need for expensive devices, filters, energy and/or complicated methods of using the device.

In depopulated areas such as remote islands and secluded places in the mountains, it is very difficult to obtain and keep safe drinking water and water for irrigating plants. In recent years, further, with the desertification of agricultural areas, the conversion of desert to agricultural land is an important issue in development as well as a population problem, and water supply is a great problem to be solved for accomplishing the conversion of desert to agricultural land. These areas in particular are prone to water contamination, resulting in poor water quality. Inability to provide clean drinking water to such areas hampers its development and increases disease and death. Another important development is that climate change causes some areas of the world to become very dry and shortage of fresh water supply is an increasing problem. Further, salt water of the ocean is coming land inward and salting the water wells. Inhabitants of such areas are faced with the problem of getting fresh water for their own consumption, life stock and for irrigation and are often faced with the necessity to move their home to less dry areas.

One way of solving this problem is by providing an area with a large-scale water-purification installation. However, in particular for most depopulated areas, the provision of such an installation is not feasible due to high costs. These installations for purifying a large amount of water often use an ion-exchange method, a diaphragmatic osmosis method, a reverse osmosis method or a multi-flash method, in particular when de-salting seawater. These methods are effective for treating a large amount of seawater, but a large investment is required for installing the necessary equipment, and also a large amount of energy is required for desalting seawater. Therefore, for small communities and individuals, the cost for desalting seawater in such installations is too high. Further, in most cases, it is difficult to install such a plant in a remote area such as an island, remote desert areas or secluded places in the mountains in terms of building cost and the supply of energy for the operation of the plant.

There is a desire for easy to use small scale mobile devices for distilling fresh water from unclean water. Known devices comprise a reservoir for un-fresh water, which is covered by a sloping glass plate ending at its lower end in a gutter for collecting condensed water running down from the glass plate. The gutter may bring the condensed water to a fresh water reservoir or duct.

One such a device is disclosed in U.S. Pat. No. 5,468,351, which describes an apparatus for recovering fresh water comprising a structure formed of a roof member having a gradient and a base member provided with a liquid reservoir member. One embodiment of this disclosure comprises a roof member being positioned over the base member and having a corrugated cross-section. Disadvantageously, the disclosed embodiments of U.S. Pat. No. 5,468,351 are not very efficient due to slow heating of the contaminated water and thus a slow release of clean water as condensation on the roof member. Also, the disclosure of U.S. Pat. No. 5,468,351 does not allow for rapid heat absorption, especially when the sun is coming up low and moving from east to west where it is going down again. Radiation cannot enter the structure then. Also, since the liquid reservoir member has an open top, the droplets resulting from the condense must travel quite far along the roof member, increasing the chance of falling back into the reservoir with the contaminated water. Also, slow drainage of the water from the cover may result in an opaque or polluted inner surface, which slows down the evaporation process of the water contained in the porous mass. A polluted inner surface may also increase the temperature of the roof member, thereby limiting the condensation rate.

Document GB1412971 discloses a solar still which evaporates contaminated water and gathers condensed water. An embodiment disclosed by this document comprises a trough having a porous mass, having pores of a capillary size and extending above the maximum free-standing water level in the trough. The trough extends above the maximum free-standing water level so that the water is raised by capillary action of the porous trough. It is then evaporated from its surface and condensed on a cover. Distilled water is then collected along the side of the through. A disadvantage of the disclosure of GB1412971 is that the condensed droplets may readily fall back onto the porous mass upon accumulation. Particularly, upon condensing, the condensed water drops from the cover due to its own accumulated weight. Also, slow drainage of the water from the cover may result in an opaque inner surface, which slows down the evaporation process of the water contained in the porous mass and limits the condensation rate of evaporated water.

Document GB1497953 relates to a method of producing distilled water using solar energy and an automatic device using said method. The method comprises a plurality of convex lenses that concentrate sunlight to heat water contained in a vaporization chamber with the resulting water vapor rising through a transparent partition through holes into a condensation chamber. There, the water is cooled and condensed by cool air passing through a cooling air chamber directly above the condensation chamber. The resultant condensate is collected in grooves on the partition and leaves the device to a collection device or outlet.

Document US2016/136537 discloses a low pressure mechanical sea water desalination or water purifying apparatus. The apparatus comprises a glass tube, approx. 10 cm in diameter and 1-20 m long. The tube comprises an inner 'sluice channel' and an outer sealed cover. Water can flow into one end of the tube, and flows slowly towards the other end of the tube through the sluice channel. The water is scrubbed by a moving conveyor belt to remove solids, and it is heated by sunlight, causing the water to evaporate and leave a small opening in the top of the sluice channel. Water is then condensed on the inside of the outer sealed cover and can be collected. The devices are intended to be installed as part of an 'array' of thousands for mass-scale water desalination or purification.

U.S. Pat. No. 4,745,707 discloses a plant pot assembly characterized by a container covered by a substantially impermeable cover such that water may be drawn upwardly through a capillary space between the covering and the container to irrigate a plant disposed within the container. The assembly also includes an outer enclosure which distils irrigation water.

Thus, there is a particular need for an improved water distiller, providing efficient and quick heating of contaminated water for evaporation and efficient drainage of distilled water in a simple and affordable manner.

BRIEF SUMMARY OF THE INVENTION

The present invention addresses these problems by providing a water distiller, for distilling contaminated water, the water distiller comprising:

a) a first container, for containing contaminated water, the first container comprising a first base and a first wall, upwardly extending from the first base;

b) an outer cover, c) a water collection unit, characterised in that the water distiller further comprises d) an inner cover, for enclosing a volume in the first container, which inner cover comprises at least one aperture and is positioned below the outer cover, wherein the inner and outer cover are designed for transporting condensed water to the water collection unit and wherein the outer cover is transparent for heating the contaminated water in the first container by sun radiation or wherein the first container is provided with electrical heating means, preferably powered by solar energy, for heating the contaminated water in the first container or preferably both.

The water distiller of the present disclosure can distil contaminated water in a highly efficient way. Contaminated water also includes water containing material, preferably organic material such as leaves. Contaminated water is to be understood as any deviation from fresh water and not limited to any form of contamination. Contaminants can be for example detergents, salt, crude oil, excrements, urine etc. Horizontal is defined as the direction perpendicular to the direction of gravity. Up, upwards or upper is in the direction against the direction of gravity. The term upward extending means as seen upward from the bottom plane of the distiller. The term inner or inside implies at the inside of the water distiller and outer or outside means at the outside of the water distiller. Preferably, upward extending outer walls of containers described herein are tapering outward allowing the containers to be stacked. Similarly, downwardly oriented side walls at the perimeter of the outer cover described herein are preferably also tapered outward downwards allowing the covers to be stacked.

The contaminated water is disposed in the first container, in which it is heated to produce water vapor. The inner cover comprises at least one aperture, preferably a plurality of apertures, through which the water vapor can pass. An aperture is understood to be any opening in the inner cover, or between the inner cover and the first container, through which evaporated water can pass. The inner cover is positioned and shaped to fit in or on the first container, so that the inner cover encloses a volume of the first container.

The transparent outer cover is positioned above the inner cover. The outer cover may be connected to or supported by the first container but may also be suspended above the first container. The outer cover covers the water distiller in a substantially airtight manner to prevent water vapor to escape from the water distiller. Depending on the embodiment of the water distiller, the outer cover may be connected to the first container or to the collection unit in a substantially airtight manner. The outer cover may be a slanted flat cover plate but may also have other general shapes comprising downward oriented surfaces, for example a triangular, pyramidal, trapezoidal, round, dome, semi-cylindrical, oval shaped, etc., which shapes may also be truncated. The outer cover may comprise corrugations as described below.

The water vapor will pass the one or more apertures of the inner cover and reach the outer cover and, as this is lower in temperature, condensate on the inner surface of the outer cover and form clean water droplets. The water droplets on the inner surface of the outer cover may drip from the outer cover on the upper surface of the inner cover. The inner cover and outer cover are designed for transporting the condensed water to the water collection unit, typically by gravity.

In a preferred embodiment the water collection unit is an outer container comprising an outer base and an outer wall upwardly extending from the outer base, wherein the first container is covered with the inner cover and is positioned inside the outer container which is covered and closed by the outer cover. In this embodiment, the collection of distilled water is received in a bottom region of the outer container, under the first container, such as the outer base. Preferably, the condensed water runs from the outer cover and the inner cover through a spacing provided between the upwardly extending walls of the first container into the outer container. The first container and/or the outer container are preferably provided with spacers to provide a defined spacing between the first and outer container.

In an embodiment, the distiller is doughnut shaped and has a central opening for surrounding for example a plant or tree. In that case the first container and outer container have a central opening from which an inner wall extends upward and the outer and inner covers have a corresponding central opening for covering and enclosing the outer and first container. A spacing may or may not be provided also between the inner upward extending wall of the outer and first container allowing the condensed water to flow into the outer container. In this embodiment the water distiller can be used to provide clean water to a plant. The water collection unit that is integrated in the water distiller, allows to store the distilled water so that daily an equal quantity of water can be given from the water collection unit to the plant or tree even when the produced distilled water quantity differs because of less or more sunlight.

Preferably, at least a part, preferably a major part, of the surface area of the outer cover and preferably also of the inner cover is slanted at an angle with a horizontal plane perpendicular to gravity and preferably also at an angle with a horizontal plane of the base wall of the first or outer container, wherein the angle is preferably at least 10°, preferably at least 20°, more preferably at least 30°, even more preferably at least 40° and preferably lower than 80°, more preferably lower than 70°, or even 60°. As the outer cover is at an angle with earth's gravity, the condensed water droplets move downward faster towards the water collection unit once they have accumulated enough weight. If the condensed water droplets drop down before they reach the water collection unit they fall onto an upper surface of the inner cover which is partially open to pass water vapor and partially closed and thus prevent condensed water droplets to fall back into the first container and reflux into the contaminated water.

It was found that the condensation on the outer cover reduces the incoming sunlight. In view of optimising the amount of incoming sunlight it is preferred that the outer cover comprises, preferably in addition to the slanted surface as described above, an outer corrugated surface over at least a part of its surface area comprising a plurality of outer corrugations having an upper portion and a bottom portion and wherein preferably the upper portions and the bottom portions of the outer corrugations are spaced apart by wall portions, said wall portions preferably being at angle between 20° and 70°, preferably between 30° and 60°, more preferably between 40° and 50°, even more preferably about 45°. It was found that the corrugated shape of the outer surface causes the droplets to move down faster to the collection unit and thus increases the amount of sunlight passing the outer cover. So, there are two different angles; the first angle of the surfaces of the cover slanting down towards one or more edge of the cover and one of the corrugations on that, preferably slanting, surface.

Droplets running down from the transparent outer cover gain weight by coalescence as they run down and are more likely to fall down from the outer cover at a lower part of the outer cover. Therefore, it is preferred that the inner cover comprises a slanted and/or corrugated surface wherein the apertures are positioned at an elevated region of the slanted surface of the inner cover, so preferably spaced away from the lower part of the outer cover where droplets more likely to fall.

Several combinations of inner and outer cover shapes are possible. The outer cover may be slanted or dome shaped to allow water to run down by gravity, whereas the inner cover may not be slanted. In such configuration the inner cover can also be substantially flat, and the inner cover may comprise apertures that are provided on elevations extending above the main plane of the inner cover. The inner cover may comprise apertures that are, at least partially and preferably completely, surrounded with an upward extending ridge. Combinations of these embodiments can be used to prevent condensed water on the inner cover to flow through the apertures back into the first container. For example, the inner cover may have apertures on a slanted surface that are surrounded with an upward extending ridge. However, most preferably the inner and the outer cover are both slanted to allow the condensed water droplets to move downward over the upper surface of the inner cover to the water collection unit. Most preferably, the inner and outer cover are similarly shaped leaving a defined substantially uniform spacing between the inner and outer cover.

The inner and outer cover are designed to transport condensed water to the water collection unit. The design may vary for different embodiments. The inner cover is preferably provided with a sloping surface optionally having channels allowing condensed water droplets to run down to a lower point where the condensed water can flow into the water collection unit. The inner cover may not have a ridge at the lower point such that condensed water can flow into the container along the entire lower edge of the inner cover. The inner cover may have an edge provided with an upward ridge and an opening in the ridge, or no opening in the ridge but an opening in surface, optionally provided with a duct to allow condensed water to flow to the water collection unit.

The energy for the evaporation is preferably coming directly or indirectly from sunlight and therefore the distiller has a substantially transparent outer cover. Transparent is understood to mean that there is low absorption of the sun's radiation, preferably sunlight in the outer cover such that a large amount of the sunlight's energy can pass through to the inner cover. This not only allows better direct or indirect heating of the contaminated water in the first container but also creates a temperature difference wherein the outer cover is lower in temperature than the inside of the container to create condensation on the inner surface of the outer cover. Suitable materials for high transparency to sunlight are known in the art. It is preferred that the outer cover is made from a transparent material that also permits UV light to pass through substantially unabsorbed. The advantage is that the UV light has disinfecting effect and prevents growth of micro-organisms like algae in the water. In case at least part of the water collection unit, preferably the outer container, is made transparent made as described below, it is preferred that also that part is made from UV transparent material. A suitable UV transparent material is UV transparent polypropylene material. This polypropylene material has good strength and toughness. Furthermore, it is advantageous if the substantially transparent outer cover also permits infrared (IR) light to pass through, thereby increasing the amount of energy absorbed by the inner cover, while limiting the amount of energy absorbed by the outer cover. This leads to an increased efficiency of both evaporation and subsequent condensation.

In one embodiment, the distiller according to the invention comprises heating means other than the incoming sunlight. Preferably, the wherein the first container is provided with electrical heating means, preferably powered by solar energy, for heating the contaminated water in the first container. In a most preferred embodiment the distiller comprises both an outer cover that is transparent and a first container provided with electrical heating means. The distiller according to the invention comprising electrical heating means and an outer cover that is not transparent also has the advantage of improved efficiency of the distillation by more efficient transport of condensed water droplets and increased water evaporation as herein described.

The advantage of combined electrical and solar radiation heating is that the distiller can operate at higher productivity level because the contaminated water is heated faster. The electrical energy can evidently be provided from the electricity net, but for reasons described above, the water distiller is preferably used as a mobile stand-alone unit and therefore is preferably provided with solar cells or a small windmill for electricity generation and is preferably provided with a battery for storing the generated electrical energy. Preferably, the heating means are provided with a thermometer and thermostat control to control a set temperature of the contaminated water in view of optimal distillation productivity and to prevent overheating. The advantage of electrical heating is not only a higher productivity of water distillation but also the independence of solar radiation. The heating of the contaminated water can continue during the night. Depending on the amount of electricity generated and stored, the heating means can at least reduce cooling down during the night, and possibly even continue distillation during the night. When using electrical heating, it must be assured that the outer cover has a lower temperature than the inside of the water distiller to assure condensation on the inner surface of the outer cover. This can be achieved simply by leaving the distiller outside when cooling in the night.

The electrical heating means can be a resistance heating element integrated in the first wall or first base of the first container. Alternatively, the electrical heating means is an immersion heater having an electrical resistance heating element encased in a tube that can be positioned in the first container in the contaminated water to be heated. Such immersion heater is simpler and less expensive. The immersion heater can be inserted into the first container through a filling opening as described below or a separate opening similar to the filling opening and is provided with a cap to close the filling opening and to fix the position of the immersion heater in the first container to a distance of preferably 1-2 cm from the first base of the first container.

In a preferred embodiment the outer cover is transparent, and the inner cover may also be transparent but is more preferably opaque and most preferably in-transparent and preferably provided with a light absorbing substance, preferably a dark colour, to maximally absorb energy from solar radiation. Preferably, the inner cover has a thermal emissivity measured according to e.g. ASTM C1371-15 of at least about 0.50, preferably of at least about 0.60, more preferably of at least about 0.70, even more preferably of at least about 0.80. The light absorbing substance increases the energy uptake from the sunlight and increases and the heating of the contaminated water and ensures that the energy which is provided by solar radiation is maintained in an efficient manner. Should any solar radiation pass through the apertures in the first container and reflect off the water in the first container, it will be received on the inner surface of the inner cover. As a result, the water distiller achieves a high energy retention. The inner cover not only stimulates the entrance and absorption of the energy during the day, but also prevents the cooling down of the water during the night by preventing a part of the stored energy in the water to be lost through convection. Compared to the reflectivity of the water in the first container, the inner cover preferably has a high energy absorbance, thereby increasing the efficiency of the water distiller.

The total surface area of the apertures in the inner cover covering the first container is between 10% and 90%, preferably between 20% and 80%, preferably between 30% and 70% of the surface area of the inner cover covering the first container that allow water vapor to pass. The aperture surface area % is the area % of the inner cover part covering the first container. The surface area of openings in the inner cover that are not covering the first container and do not allow water vapor to pass are not included in the aperture surface area; for example a filling opening or a central opening in the inner cover corresponding to a central opening in the container wherein a plant is to be positioned (see FIG. 1). The aperture surface area percentage should not be too low in view of permitting water vapor to pass but should certainly not be too high in view of optimising absorption of sunlight and preventing reflux from condensed water droplets back into the contaminated water.

In a most preferred embodiment, the inner cover comprises over at least part of its surface area an inner corrugated surface comprising a plurality of inner corrugations having an upper portion and a bottom portion and wherein preferably the apertures are positioned in the upper portions of the corrugations and wherein the bottom portions are designed to channel collected condensed water towards the water collection unit. Preferably the inner corrugated surface is also slanted at an angle with a horizontal plane perpendicular to gravity as described above. Preferably the upper portions and the bottom portions of the corrugations are spaced apart by wall portions, said wall portions being at angle between 20° and 70°, preferably between 30 30° and 60°, more preferably between 40° and 50°. In this embodiment further optimisation is achieved of absorption of sunlight and preventing reflux from condensed water droplets back into the contaminated water. The angle between wall portions stimulates the water droplets to quickly move to the bottom portion, the angle of the corrugated area stimulates the collected water droplets to move to the water collection unit. The corrugations in the outer cover, and preferably also in the inner cover, preferably have a triangular cross-sectional shape and extend radially downward from the centre.

It is particularly preferred in the above embodiment that the inner corrugations of the inner cover align with the outer corrugations of the outer cover such that the bottom portions of the outer corrugations align with the bottom portions of the inner corrugations such that condensed water droplets falling from the bottom portion of the outer corrugations of the outer cover fall in the bottom portion of the inner cover and minimally in the apertures provided in the upper portion of the inner corrugations.

A further improvement in the speed of flow of condensed water and distillation efficiency is achieved when at least part of the upper surface of the inner cover and/or at least part of the inner surface of the outer cover are and preferably both are water repellent, preferably by being made from a hydrophobic material or by being modified with a hydrophobic coating or by a lotus leaf surface structure or combinations thereof. A further advantage of this is that the surfaces do not so easily pollute which prevents infection and prevents fouling and hindering light to pass.

Preferably, the inner surface of the outer cover and the upper surface of the inner cover are further provided with an adhesion-reducing additive and/or cover layer, for instance of PET and/or Teflon, and/or through the use of small protrusions and/or roughening, possibly with an addition of, though not limited to, a wax film, a silicone or Teflon product or other adhesion-reducing substance, so that a water-repellent effect is obtained in that the mutual cohesion of water increases and/or the adhesion of water to the surface of the instrument decreases, so that larger drops are formed. As a result of this, due to the increased weight and hence increased sensitivity to gravity and due to the proportionally lower adhesion as a result of the larger drops formed, the drops can more easily reach the lower parts of the outer cover and/or the lower parts of the inner cover (or the lower parts of the corrugated surface), so that the amount of recovered moisture increases. This way it is also prevented that the inner surface of the outer cover will be polluted by living organisms and/or dust particles, so that the outer cover remains transparent helping to keep the radiation of the sun as high as possible entering the unit, so that an optimum energy entrance to make the water in the first container as warm as possible, will continue to exist.

In view of catching as much as possible sunlight during the day it is preferred that the outer cover, and preferably also the inner cover, have one surface part slanting down towards one edge and another adjacent surface part slanting down toward another opposite edge of the outer container, forming a dome shape. In an embodiment, the one edge of the outer container is an outer edge of the outer container. The one edge of the outer container may be an outer edge of a circumferential edge. The one edge of the outer container may also be a single side edge of a square or rectangular outer container. In an embodiment, the opposite edge may be an inner edge of the outer container, which inner edge delimits an opening in the outer container (e.g. a donut shape). In another embodiment, the opposite edge may be a single side edge of a square or rectangular outer container, opposite the single side edge described above. This shape assures that solar radiation can enter the distiller during the entire day when the sun moves through the sky. Preferably, a surface part is slanted at an angle with a horizontal plane perpendicular to gravity between about +5° and +70°, preferably of between about +10° and +50° and the other adjacent surface part of the cover is slanted at an angle with a horizontal plane perpendicular to gravity between about −5° and −70°, preferably of between about −10° and −50°. For example, in case the horizontal cross-sectional shape of the distiller is square or rectangular, the outer cover may be elongate dome shaped having two surface parts sloping down to opposite edges of the outer container or having four surface parts sloping down to all four edges of the outer container. In case the distiller has a circular horizontal cross-sectional shape, the outer cover can radially slope down from the centre to the edge of the circular outer container. In case the distiller has a horizontal cross-sectional donut shape with an inner wall forming a central opening, the outer cover can be circular dome shaped with one surface part sloping towards the inner wall and one surface part sloping down towards the outer wall of the outer container.

In certain embodiments, such the water collection unit may be a gutter, a tube, a second container, a cup, a bottle, an outer container, or combinations thereof. The water collection unit is positioned in such a way that condensed water droplets from the inner and/or outer cover reach the water collection unit. This includes an embodiment where the water droplets first drip from the outer cover onto the upper surface of the inner cover prior to being collected by the water collection unit. This also includes an embodiment wherein the water collection unit is a gutter, tube or other water duct that directly brings the distilled water to a point where it is used, i.e. without substantial storing of the distilled water, for example for plant irrigation. A water storage function of the water collection unit is however preferred as buffer for fluctuations in the distilled water production. The water collection unit can also be an integrated part of the inner cover.

The outer wall and the first wall are preferably spaced apart by a wall spacing of 0.5 to 6 cm, preferably of 0.5-4 cm, more preferably of 1 to 2 cm and preferably along the entire periphery of the outer wall and the first wall and wherein preferably at least a part, preferably all, of the first base of the first container and the outer base of the outer container are spaced apart by a base spacing of at least 0.5 cm, more preferably by at least 1 cm, even more preferably by at least 3 cm and preferably less than 10, more preferably less than 8 or 5 cm.

By providing a spacing between the first wall and the outer wall, the first container is air-isolated from the outer container. Also, the inner cover creates an isolating air spacing between the inner and outer cover. This has the advantageous effect that the water in the first container does not cool down quickly as heat loss via the first wall is limited. As a result, the energy gathered during the day is not easily lost during the night and it takes less time during the day to raise temperature again to evaporate the contaminated water, thus increasing the efficiency of the water distiller.

By providing a space between the first base and the outer base, the condensed water can accumulate in the outer container, while still providing insulation to the heated contaminated water in the first container. It is particularly advantageous if the space between the first base and the outer base comprises air in addition to the accumulated distilled water. Air insulates the first container from the outer container, thereby slowing down the transfer of accumulated heat from the first container to the outer container. As a result, the contaminated water in the first container heats more effectively and retains its heat for a longer period of time. This ensures an increased efficiency of the water distiller.

Preferably, the first container or the inner cover or the combination of the two provide an opening for overflow of overproduced distilled water back into the first container.

The first container preferably comprises means positioned inside the first container to increase evaporation from the water in the first container, preferably these evaporation means are capillary means having a capillary function positioned partially in and partially above the envisaged water level in a substantially vertical direction and preferably are one or more capillary chords, cloth or felt, preferably extending downwardly from the inner cover into the first container. First, the capillary function of the evaporation means provides an increased evaporation surface area and can provide an increased absorption of sunlight entering through the apertures in the inner cover directly or reflected by the contaminated water. In order to stimulate this effect, it is also possible to give the evaporation means a colour, preferably a dark colour. Furthermore, if the evaporation means are suspended from the inner cover, it can also provide a conductive path for heat to pass from the inner cover to the contaminated water in the first container. It is further preferred that the capillary means extend over the upper surface of the inner cover, for example a capillary cord through 2 apertures in the inner cover having an upper end above the upper surface of the inner cover and two ends pending into the first container. The advantage is that the upper end of the capillary means is heated by solar radiation and by being on contact with the inner cover that is hotter by absorbing the solar radiation, so the evaporation rate at the top end of the capillary means is high, which creates an upward capillary flow of the contaminated water. The rate of evaporation can be influenced and set by the number of capillary means. Ultimately, even higher evaporation fan be obtained if capillary means are provided from all apertures in the inner cover as described above.

Further additional heating means can be provided at the top end of capillary elements that are immersed in the contaminated water as described below, which caused a continuous upward stream of water from the first container through the capillary elements resulting in increased evaporation. For example, a heating element can be provided on or below the inner cover and capillary elements are pending from the heating element, in particular an elongate heating element can be provided along at least part of the periphery of the inner cover and a plurality of capillary elements are pending from the heating element, through the apertures when the heating element is positioned above the inner cover.

The water distiller preferably allows sunlight to directly heat at least part of the wall of the first container. This can be achieved either by an outer wall of the outer container that extends lower than the first wall of the first container, preferably by at least about 1 cm, more preferably by at least about 3 cm, even more preferably by at least about 5 cm. If the outer wall extends slightly below the first wall, the transparent outer cover must also extend further in a vertical direction to close off the outer container. As a result, angled sunlight can more easily reach the surface of the inner cover and/or the first container.

Alternatively, or in combination, at least a top portion of the outer wall is transparent for at least about 3 cm or ultimo the entire outer container can be transparent. If the surface area of the outer container and outer that is transparent is larger, the contaminated water is heated more quickly, and the water distiller is more effective. If the entire outer container is transparent, the same effect is achieved, without added production difficulty of manufacturing a partially or wholly water collection unit.

If the distilled water is contained in a transparent outer container (rather than being guided away immediately), algae could form in the distilled water in the outer container. When storing the distilled water in the water collection unit for a longer time, for example for irrigating in desert areas, it is advantageous that sunlight cannot directly reach the distilled water because that would stimulate the risk of growth of algae in the distilled water. In applications where this is a risk, the outer container is preferably at least partially disposed in the soil or can be covered or coloured in such a way that light cannot enter. As a result, sunlight will not reach the areas of the outer container where the water is stored, which are prone to algae growing. This increases the safety of the water distiller for a user, in particular upon usage over a longer period of time.

When the water in the water collection unit is guided away quickly after its production to a duct or recipient, for example a bottle, additional container or can connected to an opening below the water collection unit, and no risk of growth of algae is present, then it can be advantageous that the entire outer container is transparent so that the first container is not only heated by radiation from the top and/or a part of the side, but heated through radiation at the whole side and bottom.

The water distiller including the first container and outer container and the inner cover and outer cover preferably have a circular or square circumferential shape (in horizontal cross-section).

In an embodiment wherein the water distiller functions as a plant irrigation device, it is particularly advantageous to provide a water distiller which is shaped to at least partly surround and protect a plant. The term plant herein is to be interpreted broadly, including but not limited to plant, tree, vegetable, seedling plug etc. This can be achieved by shaping the water distiller components in such a manner that the distiller forms a recess or an opening extending through the water distiller (donut like shape) so that the water distiller can at least partly surround and protect the plant positioned in the opening as well as provide water to the roots of the plant. The opening is preferably in the centre, can be circular, oval, dumbbell, stadium or square shaped and preferably is broader at the bottom than at the top tapering out downward.

In another embodiment the water distiller may be in the form of an assembly of two or more separate water distillers having a recess in at least one side or corner which, when placed together, cooperatively form an opening to surround and protect a plant positioned therein. It was found that the water distillers can move apart during use which exposes the soil beneath to sunlight which dries out the soil and kills the plant. Therefore, the two or more water distillers in the assembly of distillers are preferably connected with connection means to prevent the water distillers from moving away from each other.

The water collection unit is suitably provided with a closable opening for draining collected distilled water, wherein preferably the opening is provided in the outer base, preferably at the lowest point of the outer base and wherein preferably the opening in the outer base comprises connection means outside the outer container, preferably a threaded protrusion downward from the outer base, to connect a duct or recipient to the outer container, which recipient preferably is a bottle. By providing an opening being the lowest portion of the outer base, standing water in the outer container is prevented, thereby leading to a decreased chance of live organism growth and pollution of the distilled water the outer container. In order to further prevent water to be polluted by living organisms—e.g. algae or bacteria—it is preferred that the outer base is mildly sloping down towards the opening to allow the distilled water to completely flow out of the outer container and the bottom portions of the water collection unit remain dry.

In an alternative embodiment the closable opening is provided in the outer wall preferably at a distance from the outer base close to the first base. This opening can also serve as an overflow opening to prevent distilled water to accumulate and fill the isolating air spacing.

In yet another embodiment, the water distiller is floatable on water, for use as a fresh water supplier on open water, for example in case of emergencies on sea. This water distiller is waterproof and has, also when maximally filled with contaminated water, a density lower than water and floats, preferably with at least 50% of the height above water level. In this use the water distiller is preferably provided with an additional float unit positioned below the outer container to make the water distiller float and to elevate the water distiller, preferably with the outer base of the outer container above water level to prevent cooling of the contaminated water in the water distiller. The float-unit can act as additional recipient for distilled water, for example connected to the water drainage opening in the outer base of the outer container. The water distiller is preferably provided with distilled water drainage means above the open water level when floating positioned on the outer container or, in case a float unit is used as additional distilled water recipient, on the float-unit. Preferably the float unit extends horizontally sideways from the water distiller to contain such distilled water drainage point.

The water distiller can be used for irrigation of plants wherein the water collection unit comprises an irrigation means, preferably a closable opening downward from the outer base, for receiving at least one wick or if necessary more wicks for the dispersion of distilled water, wherein the wick preferably is disposed on a threaded member which is arranged to be coupled to a corresponding threaded section at the outside of the outer base. The wick transports the distilled water to the subsoil of the plant. The provision of a wick allows the dispersion of water throughout the soil underneath the water distiller. This can advantageously provide plants with clean water. The wick ensures that the water is provided to the soil in a constant manner, without the water leaking away at a rate which is too high for the roots of a plant to absorb the water. As a result, the usage of water is much more efficient. The outer base positioned on the soil prevents evaporation of the supplied clean water.

It is also possible to use one or more small perforations in the base of the water collection unit without a wick. The amount of water provided to the roots of a plant in a given situation can also be tuned by changing the production of distilled water in the water distiller. This can be done by tuning the evaporation, for example by using less or no evaporation chords (e.g. capillary chords), by using a partially non-transparent outer cover or partially covering the outer cover. Thus, it can be prevented that water is leaking away with a rate which is too high for the roots of a plant to absorb the water.

The outer cover and inner cover are releasably connected to the outer container and first container with snapping means or other connections means. The first container should be cleaned from time to time as contaminants accumulate when water evaporates, and the water collection unit should be cleaned from time to time to prevent growth of live organisms. To supply contaminated water into the first container, the water distiller preferably comprises a filling opening extending through the outer and inner cover into the first container and means to close the filling opening in the outer cover and optionally also an overflow duct or opening between the water collection unit and the first container, which opening is preferably formed by one or more recesses in an edge portion of the inner cover or first container where the inner cover engages the first container.

The outer container and first container are preferably provided with corrugations or indentations in the first base and/or outer base of the first and/or outer containers and/or in the first and/or outer walls for increasing the stiffness of the container. This allows to use a lower amount of material or less stiff material for the manufacture of the container. The material preferably is a thermoplastic material that can be thermoformed. The outer cover preferably is of a transparent polymer material, for example polymethylmethacrylate, polycarbonate, poly-vinylacetate, polyethylene-terephthalate or cellulose with a very high light transparency (low light absorption). The inner cover and the first container and outer container are preferably also made of a thermoplastic polymer material that can be thermoformed, for example polypropylene. In a particular embodiment the inner and outer container are made of a material that has a high heat insulation property, for example a foamed material and/or the containers are provided with a heat insulation layer to prevent heat loss during the night, in particular in areas where the sunlight cannot reach. In the case of when the distilled water is guided away immediately after its production to the duct or recipient, the water collection unit can also be made of a transparent polymer material, for example polymethylmethacrylate, polycarbonate, poly-vinylacetate, polyethylene-terephthalate or cellulose with a very high light transparency (low light absorption).

Another measure to prevent the water to be polluted by living organisms is to make the transparent outer cover and/or the optionally transparent water collection unit, from a polymer material that allows UV light to enter—the SODIS method (solar water disinfection), so that living organisms will be killed, resulting in water that is not only distilled, but also disinfected.

The invention also relates to a method of distilling water, comprising providing a water distiller of the invention; filling the first container with water, preferably contaminated water; exposing the water distiller to sunlight; and collecting distilled water from the water collection unit. The distiller of the invention produces more water than the existing distillers for one or more of the following reasons:

a) the inner cover amplifies heating of the contaminated water by absorption (color);
b) the inner cover prevents water cooling by counteracting loss of energy caused by convection and radiation;
c) the corrugated surface and the hydrophobicity of the outer surface accelerates droplet formation and transport of condensed water from the outer cover to the collection unit and thus prevents blocking of sunlight;
d) the inner cover prevents reflux of condensed water back into the first container;
e) the particular shape (in particular the corrugations) of the combined inner and outer surface very efficiently promotes transport of condensed water to the collection unit and reflux of condensed water back into the first container;
f) the space between inner cover and outer cover and the space between first container and outer container has a stationary air layer, which at night isolates and prevents loss of heat by convection;
g) the counteracting of nightly cooling of water assures that the contaminated water is at higher temperature already in the morning and produces earlier and more vapor and water distillate during the day;
h) the transparent outer cover extends lower than the first container so that the first container is heated directly from the moment the sun rises;
i) use of a transparent outer container for use in situations when the distilled water is directly drained from the water collection unit, so that maximum solar energy is used;
j) the dome shaped outer cover and inner cover maximally catch daylight during the day when the sun moves through the sky without having to adjust the position towards the sun; and/or
k) the capillary means in the first container increase evaporation and light absorption.

The invention is primarily aiming to help poor people in arid areas. In a preferred use of the distiller of the invention, the distiller is small enough to be inexpensive and flexible in use for reasons described above. The size of the distiller (defined as the longest horizontal cross-section) then is preferably between 20 cm and 100 cm, preferably 30-60 cm and between 10 and 60 cm, more preferably between 15 and 50 cm high. However, it is noted that the inventive concept works irrespective of size. For use in larger communities or agricultural use (irrigation or life stock drinking water supply) the distiller size can also be for example 2 or 3 meters and between 10 and 100 cm high. A larger horizontal cross-sectional size is advantageous because that increases the area for harvesting energy from the sun's radiation and increases the possible surface area of contaminated water and the evaporation in the first container.

The amount of contaminated water added into the first container should not be too high because during the day/night temperature cycle it takes quite some time, after cooling of the contaminated water during the night, to heat up again during the day to a point that evaporation can takes place. This evidently depends on the radiation intensity and the prevailing day and night temperatures. Good results can be obtained when filled to a height of at most 20 cm, preferably at most 15 cm, more preferably at most 10 and in some cases at most 5 cm. in a distiller between 30 cm and 100 cm in longest horizontal cross-section and between 20 cm and 50 cm high. It can be advantageous to provide isolation at the outer wall of the water collection unit, in particular in the bottom part of the outer wall where the distilled water is stored. Advantageously, the first container is filled with warm contaminated water during day time.

In an aspect according to the present invention, there is provided a water distiller, for distilling contaminated water, the water distiller comprising: a first container, for containing contaminated water, the first container comprising a first base and a first wall, upwardly extending from the first base; an outer cover, a water collection unit, for collecting distilled water, wherein the water distiller further comprises an inner cover, for enclosing a volume in the first container, which inner cover comprises at least one aperture and is positioned below the outer cover, wherein the inner cover and the outer cover are designed for transporting condensed water to the water collection unit, wherein the outer cover is transparent for heating the contaminated water in the first container by sun radiation, and wherein the first container comprises means to increase the evaporation, preferably capillary means having a capillary function positioned inside the first container partially in and partially above the envisaged water level wherein the capillary means preferably are capillary cords, cloth or felt and are preferably suspended from the inner cover into the first container.

In an aspect of according to the present invention, there is provided an inner cover according to any of the embodiments described hereinbefore, wherein the inner cover comprises means to increase evaporation, preferably capillary chords having a capillary function. In an embodiment, the inner cover is provided with capillary chords, said capillary chords being arranged to extend into contaminated water. This increases surface area for evaporation and increases evaporation efficiency.

The invention also relates to a kit of parts for assembling a water distiller according to any embodiment of the invention as described hereinbefore. As an example, the kit of parts for assembling a water distiller may comprise; a first container, the first container comprising a first base and an upwardly extending first wall; a water collection unit; an inner cover; and an outer cover, wherein the outer cover is substantially transparent, and wherein the inner cover comprises at least one aperture.

The smallest product embodying the inventive concept of the invention is the combination of an outer cover with an inner cover comprising apertures. The outer cover may be anyone of the known outer covers, for example a transparent flat plate, as long as it is used in combination with anyone of the inner covers as described above. The inner cover can be positioned underneath any transparent outer cover in any prior art distillation container, for example even over a simple hole in the ground and provide increased water distillation efficiency to that prior art distillation container. The inner cover may also comprise a water collection unit, such as a gutter or a tap, for collecting condensed water which has dripped down onto the surface of the inner cover. In such an embodiment, a first container and/or an outer container are not needed for water collection. However, it is preferred that the inner cover is used in combination with anyone of the preferred outer covers as described herein.

The invention also relates to an outer cover as described any one of the preferred embodiments of the invention described above, preferably the corrugated embodiment of the outer cover, or to an inner cover as described in any one of the embodiments of the invention above. The invention relates in particular to the combination of the inner and outer cover as described in any one of the embodiments of the invention above wherein most preferably both the inner and the outer cover are corrugated, wherein the corrugations are aligned and the apertures are provided in the upper parts of the corrugations. The invention also relates to the use of the inventive outer cover, the inner cover and preferably of the combination of the inner and outer cover in a method for distilling water. This use can be for example to cover a sand pit comprising a container with contaminated water or comprising leaves, preferably crushed leaves, and a water collection container for collecting condensed water.

Another example of this use is in a known type of water distiller wherein a transparent outer cover covers the first container for containing contaminated water and the inner cover is positioned below the outer cover and wherein the water collection unit is, for example, a gutter for collecting condensed water from the outer cover and/or from the inner cover and for transporting the condensed water to a lower point, for example a distilled water container of a duct.

Other aspects of the invention relate to a kit of parts for assembling a water distiller according to the invention, to an outer cover provided with means for water collection, or a combination of an outer cover and an inner cover provided with means for water collection and the use thereof for distilling water from a container comprising contaminated water.

BRIEF DESCRIPTION OF THE DRAWINGS

The features and advantages of the invention will be appreciated upon reference to the following drawings, in which:

FIG. 3A is an angled top view of the outer container with the first container disposed therein in accordance with an embodiment of the invention;

FIG. 3B is an angled top view of the outer container of FIG. 3A with the first container removed therefrom in accordance with an embodiment of the invention;

FIG. 4 is an angled bottom view of the water distiller according to an embodiment of the invention;

DESCRIPTION OF ILLUSTRATIVE EMBODIMENTS

Figure 1:
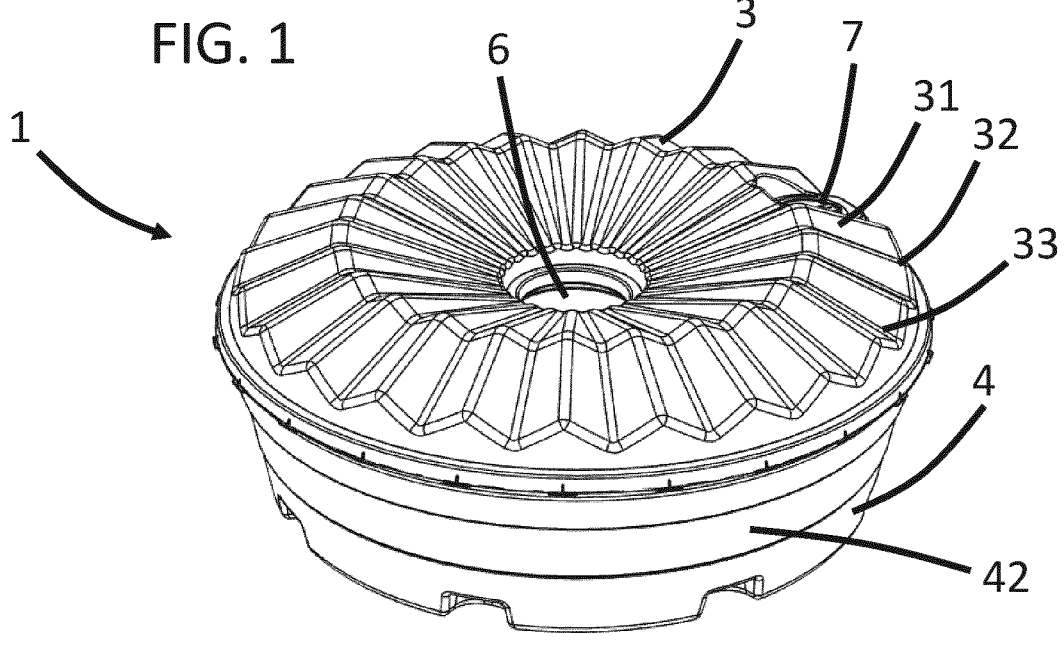
FIG. 1 is an angled top view of one embodiment of the water distiller according to the invention.

In accordance with an embodiment of the invention, FIG. 1 shows an angled top view of one embodiment of the water distiller 1 comprising an outer container 4, covered with an outer cover 3. The outer container 4 is comprised of a base 41 and an upwardly extending wall 42, thereby defining a container having an open top. The outer container 4 is connected to the outer cover 3 such that they enclose a volume therein. The outer cover 3 may be transparent and may be provided with a downward oriented side wall (34 in this embodiment) at its perimeter so that a larger part of the upward extending area of the distiller is comprised of the outer cover 3. If the outer cover 3 is transparent, allowing it to extend further down ensures a larger amount of lateral sunlight is received through the outer cover 3, thereby increasing the efficiency of the water distiller 1. Alternatively, the outer container 4 may be made transparent completely or only for an upper part of the outer wall 42.

In the outer container 4, a first container 2 is disposed, for containing contaminated water, which cannot be seen in FIG. 1 since it is disposed in the outer container 4 and under the outer cover 3 (see FIG. 3A). The outer cover 3 comprises a plurality of radially extending zig-zag shaped corrugations 31 which allow water that condenses on the inner surface of the outer cover 3 to flow to the outer container 4 more effectively. The corrugations 31 comprise a top portion 32 and a bottom portion 33. The angles defined by the corrugations 31, with respect to gravity, allow for quicker drainage of the condensed water. Water that condenses on the inner surface of the outer cover 3 is directed to the bottom portions 33 of the corrugations 31 and either drips down or slides along the bottom portions 33 to the side of the outer cover 3 for collection in the outer container 4.

In the embodiment of FIG. 1, the outer container 4 and the outer cover 3 are shaped such that a plant may be received in the middle of the water distiller through an opening 6. A part of the condensed water, or all of the water, can be used to water the plant. This is advantageous since it prevents the accumulation of sediments in the watering process, keeping the soil healthy for a longer period of time. Water irrigation system of such general shape are described for example in EP1891275, WO2012081980 and WO2016118011.

In addition, the outer cover 3 may comprise a filling opening 71, which during use is closed with closing means, such as a filling cap 7. The opening 71 directs the contaminated water through the outer cover 3, through the inner cover 5, and into the first container 2. From there, the contaminated water can evaporate due to the accumulation of heat.

Figure 2:
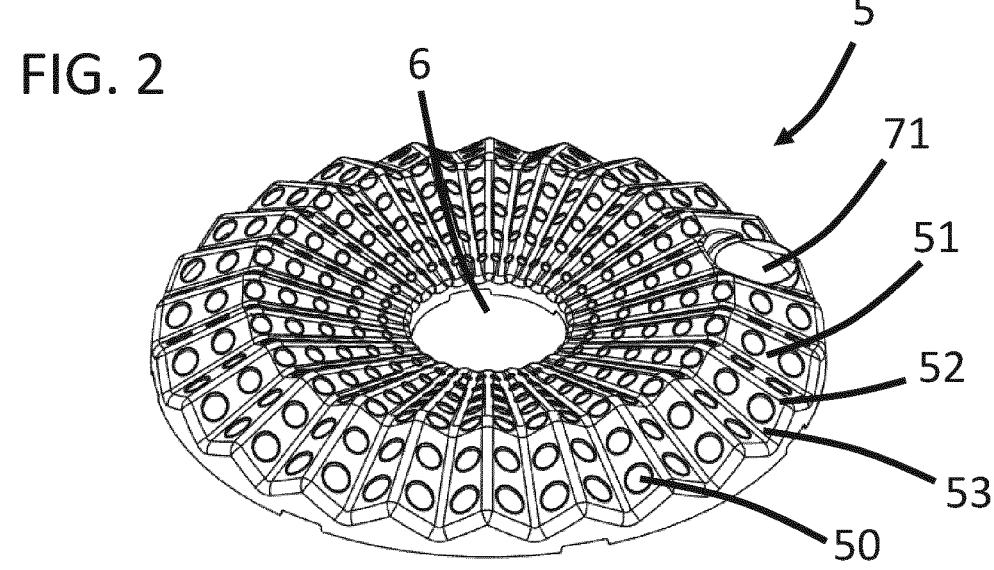
FIG. 2 is an angled top view of the inner cover according to an embodiment of the invention.

FIG. 2 shows an angled top view of the inner cover 5 according to an embodiment of the invention. The inner cover 5 is in accordance with the embodiment of FIG. 1 and is disposed on the first container 2, inside the outer container 4 and underneath the outer cover 3. The inner cover 5 is arranged to be positioned on the first container 2. However, the inner cover 5 may also be suspended above the first container 2.

The inner cover 5 of FIG. 2 comprises a plurality of corrugations 51 having a top portion 52 and a bottom portion 53. The corrugations increase the speed with which the water flows by creating a smaller angle with gravity. In this embodiment, the corrugations 51 of the inner cover 5 are in accordance with the corrugations of the outer cover 3 of the embodiment shown in FIG. 1, in particular having a similar shape of the corrugations and having the corrugations aligned above each other, such that a droplet of condensed water from the bottom portions 33 of the corrugations 31 of the outer cover 3 drops down onto a bottom portion 53 of the inner cover. This allows the water to be directed to the water collection unit or to the outer container 4 more effectively as fewer condensed water droplets fall back from the outer cover into the contaminated water.

The inner cover 5 comprises a plurality of apertures 50 in the embodiment of FIG. 2 to allow evaporated water to pass through. The apertures 50 are arranged between the top portions 52 and the bottom portions 53 of the corrugations 51. The apertures 50 may also be positioned on the top portions 52 of the corrugations 51. Thus, the chance is minimised that a droplet from the (bottom part 33 of the) outer cover 3 falls through an aperture 50. The inner cover 5 further comprises a filling opening 71 through which additional contaminated water may be provided to the first container or another area underneath the inner cover 5. As mentioned, the opening 71 may also be closed by e.g. a filling cap 7.

The corrugated surface 51 of the inner cover 5 in the FIG. 2 embodiment is slanted in two directions so that water on the surface of the inner cover 5 is directed to the periphery of the inner cover 5 or to the middle of the inner cover 5. In both cases, in this embodiment, the water would be directed at the outer container 4, or to another water collection structure.

FIG. 3A shows an angled top view of the outer container 4 with the first container 2 disposed therein. In accordance with the embodiment of FIG. 1, the outer container 4 comprises an outer base 41 and an outer wall 42. In the outer container 4, the first container 2 is provided. The first container 2 comprises a first base 21 and a first wall 22, extending upwardly from the first base 21. The first container 2 and the outer container 4 are shaped so that they define an opening 6 for receiving a plant. As shown, the opening 6 is created by an upwardly extending and tapering central outer wall 64 and central first wall 62. These walls define the opening 6 without allowing water to flow out the first container 2 or out the outer container 4. In the embodiment comprising a central opening 6, the outer cover and inner cover are slanted in two directions, one part towards the outer wall and one part towards the central opening so that condensed water is directed to the periphery of the cover and to the middle cover and flows through the spacing between the first inner and the outer container into the water collection unit.

FIG. 3B shows an angled top view of the outer container 4 of FIG. 3A with the first container 2 removed therefrom. As explained, the outer container 4 is arranged to collect the condensed water. The outer container shown in FIG. 3B comprises a base portion 41 and an upwardly extending outer wall 42 to define a volume. The outer container 4 further comprises an upwardly extending middle outer wall 64 so that an opening 6 can be defined without allowing the collected water to flow from the outer container 4. The drawings show corrugations or indentations in the bottom of the outer container and first container and indentations in the walls of the containers for increasing the stiffness of the container.

FIG. 4 shows an angled bottom view of the water distiller 1 showing the bottom portion of the outer container 4 comprising an outer base portion 41 and an outer wall 42 extending upwardly therefrom. The outer container 4 further comprises a drainage opening 43 on the base portion 41 of the outer container 4. In another embodiment, the drainage opening 43 may be disposed on the outer wall 42 of the outer container 4. The drainage opening 43 is arranged to allow clean water to be drained from the outer container 4. The drainage opening 43 may be connected to a water collection structure, to a water dissipation device, or directly to the soil underneath, depending on the application of the invention. In the embodiment shown in FIG. 4, the drainage opening 43 is coupled to a bottle 8. The bottle can be any regular bottle, such as a PET bottle. The drainage opening 43 may comprise a threaded section to receive a bottle 8 therein. The bottle 8 is arranged to collect fresh drinking water directly from the outer container 4 so that the usage of the water distiller 1 according to the invention is simplified.

Figure 5:
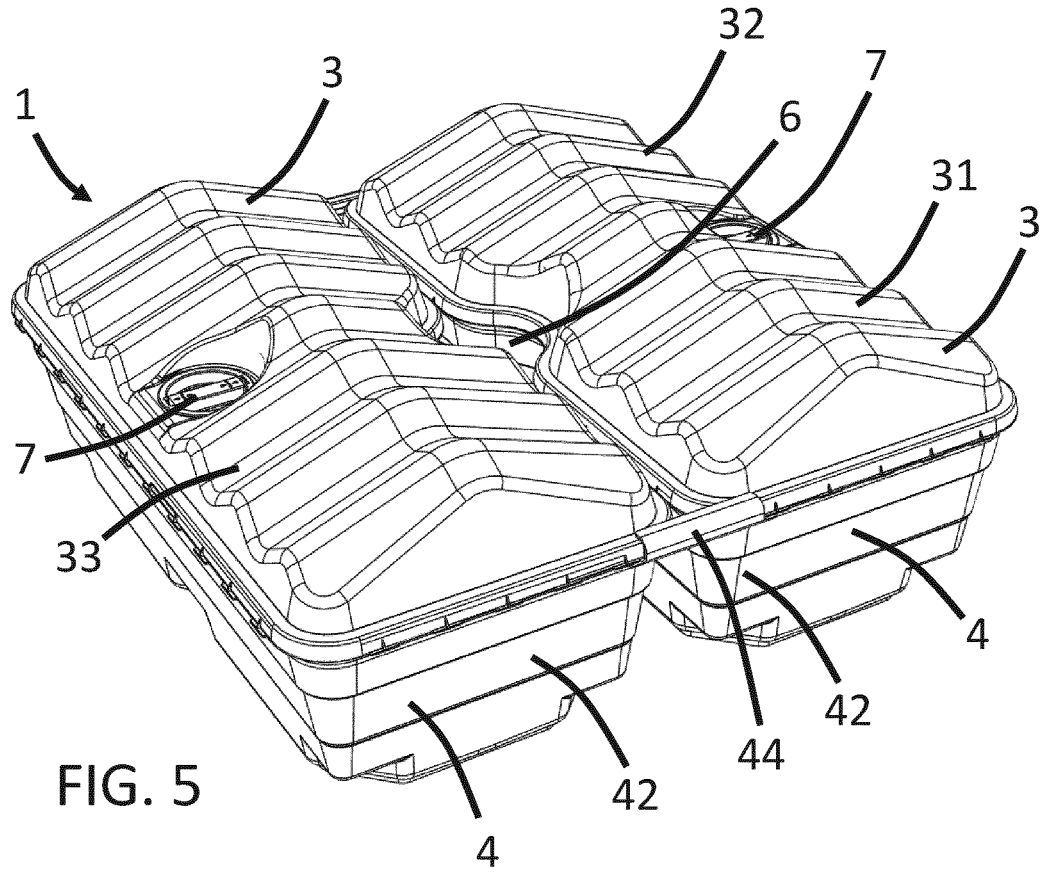
FIG. 5 is an angled top view of a water distiller in accordance with an embodiment of the invention.

FIG. 5 shows an isometric view of another embodiment of the water distiller 1 comprising two combined distillers according to the invention shaped to cooperatively create an opening for surrounding a plant. This embodiment shows two outer containers 4, comprised of two outer base portions 41 and two outer walls 42 extending upwardly from the outer base portions 41. On the outer containers 4, two transparent outer covers 3 are provided. The outer covers 3 comprise a plurality of corrugations 31 in a down shape slanting down in two directions towards two edges of the square outer containers. the corrugations having top portions 32 and bottom portions 33 for effectively directing water, condensed on the inner surface of the outer covers 3, to a water collection unit, such as the outer containers 4. The outer containers 4 are rectangular and are coupled together with a coupling member 44, arranged to hold the outer containers 4 together. The outer containers 4 and the outer covers 3 comprise a semi-circular recess in their sides. These recesses form, when the two outer containers 4 and the two outer covers 3 are coupled, an opening 6 for receiving a plant therein. Further, the outer covers 3 comprise a filing opening 71 with a filling cap 7 disposed therein to close off the filing opening 71. The filling opening 71 allows the first container 2 to be filled without dismantling the entire water distiller 1.

Figure 6:
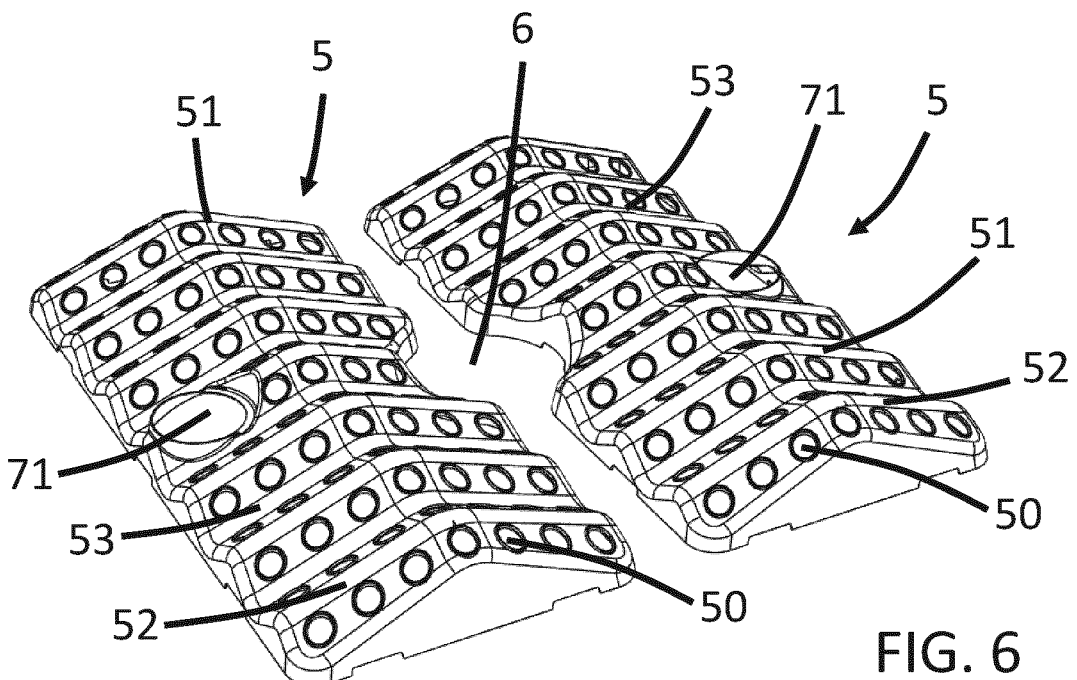
FIG. 6 is an angled top view of two inner covers of FIG. 5 in accordance with an embodiment of the invention.

FIG. 6 shows an isometric view of two inner covers 5 in accordance with the embodiment shown in FIG. 5. The two inner covers 5 comprise a plurality of corrugations 51, having top portions 52 and bottom portions 53. The corrugations 51 of the inner covers 5 in this embodiment operate in the same manner as described hereinbefore. The inner covers 5 comprise a plurality of apertures 50 to allow evaporated water to pass through and condense on the inner surface of the outer covers 3. The inner covers 5 further comprise a filling opening 71 through which the first container 2 may be filled with contaminated water. Again, the rectangular shape of the inner covers 2 defines a recess on two opposing sides, allowing for the definition of an opening 6 for receiving a plant therein.

Figure 7:
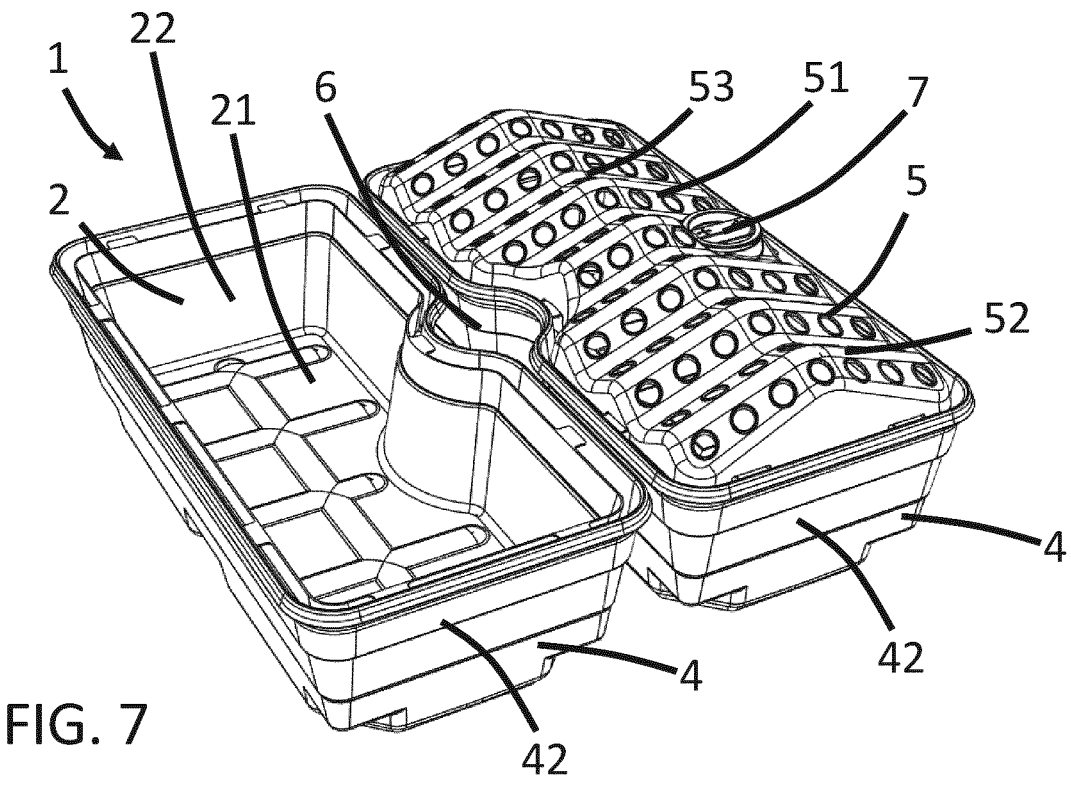
FIG. 7 is an angled top view of the embodiment of FIG. 5 with one of the inner covers removed to show the first container and the outer container.

FIG. 7 shows an isometric view of the embodiment of FIG. 5 with one of the inner covers 5 removed to show the first container 2 and the outer container 4. The left side of the embodiment of FIG. 7 shows the outer container 4 having an outer base portion 41 and an outer wall 42, with the first container 2 disposed therein. The first container 2 comprises a base portion 21 and an inner wall 22. As previously discussed, the rectangular shape of the first container 2 and the outer container 4 defines a recess for partly surrounding a plant. Together with the recesses in the components of the right side of the embodiment, an opening 6 is defined for surrounding a plant. The right side of the water distiller 1 of the embodiment of FIG. 7 shows the inner cover 5 disposed on the first container 2, within the outer container 4. The inner cover 5 is in accordance with the inner cover 5 described in previous embodiments. The filling cap 7 is shown on the right side of the water distiller 1, disposed in the filling opening 71 of the inner cover 5.

Figure 8:
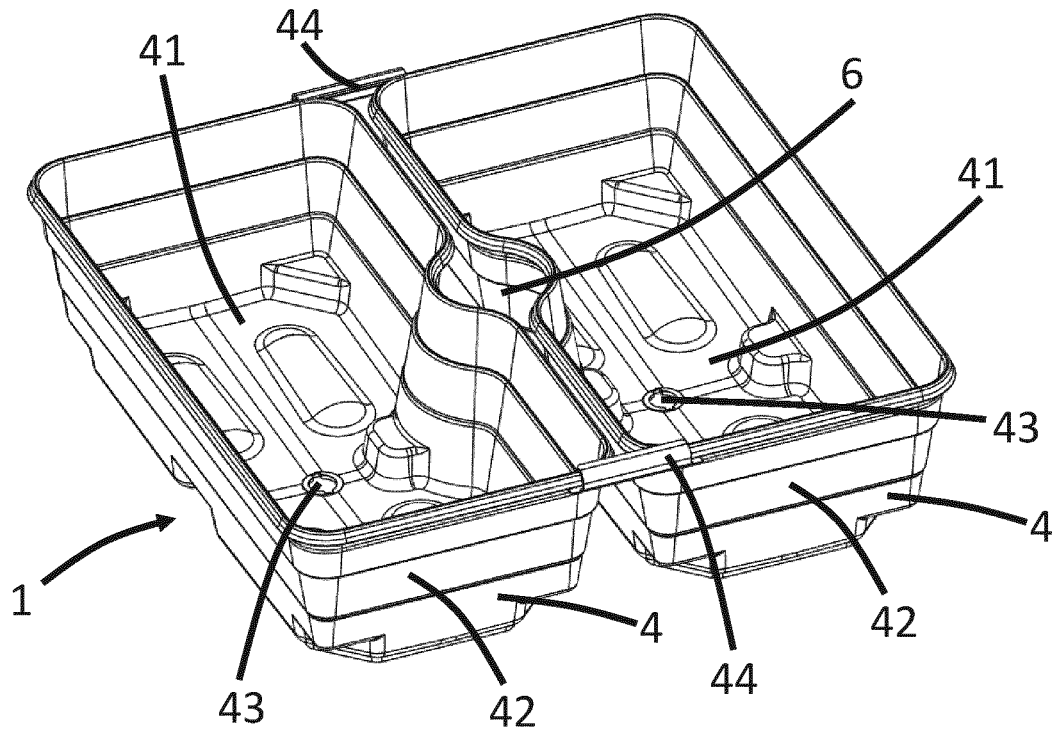
FIG. 8 is an angled top view of the embodiment of FIG. 5, showing the outer containers with the first containers and the outer and inner covers removed.

FIG. 8 is an isometric view of the embodiment of FIG. 5, showing the outer containers 4 with the first containers 2 and the outer 3 and inner 5 covers removed. The two outer containers 4 comprise an outer base portion 41 and outer walls 42 which define the inner volume of the outer containers 4. The rectangular shape of the outer containers 4 defines a recess which, coupled together, defines an opening 6 for a plant. The outer containers 4 are connected with a coupling member 44, which is arranged to connect the two (or more) outer containers 4. The outer containers 4 also comprise a drainage opening 43 to which water collection members can be attached, such as a bottle 8.

Figures 9, 10:
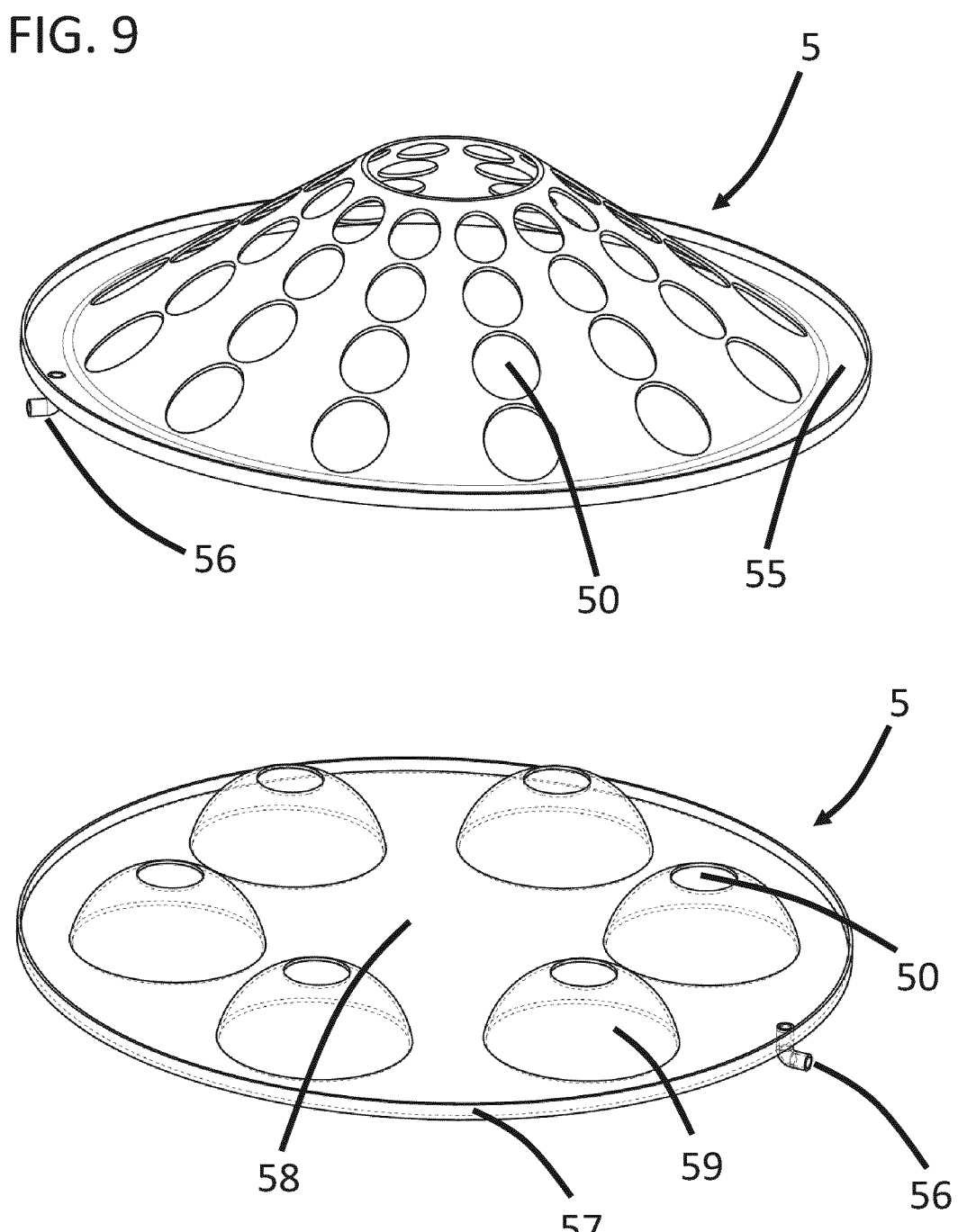
FIG. 9 is an angled top view of an embodiment in accordance with the invention showing the inner cover.
FIG. 10 is an angled top view of an embodiment in accordance with the invention showing the inner cover.

FIG. 9 is an angled top view of an embodiment in accordance with the invention showing the inner cover 5. The inner cover 5 is shaped as a truncated cone, having a plurality of apertures 50 arranged over the cone. In a preferred embodiment, these are arranged mostly near the top portion of the cone. The apertures 50 are arranged to allow evaporated water to pass through so that it can condense on the inner surface of an outer cover 3 according to any of the embodiments described hereinbefore. The inner cover 5 further comprises a gutter 55, attached to a tube 56 for draining collected water. Instead of providing a tube for transport of water to a water collection unit, the gutter can be shaped larger to function as a water collection unit. A drainage in accordance with any of the previously described embodiments can also be utilised. The embodiment of FIG. 9 allows for the omission of a first container 2 or an outer container 4. The inner cover 5, along with an outer cover 3, can be placed on any surface having contaminated water which can evaporate. Due to the inclusion of a gutter 55, in combination with a tube (or any other water collection device), the outer container 4 is not needed. As a result, the combination of an outer cover 3 and the inner cover 5 can also readily be utilised in accordance with the invention.

FIG. 10 is an angled top view of an embodiment in accordance with the invention showing the inner cover 5. The inner cover 5 comprises an upwardly directed wall portion 57, which is high enough to stop water flowing over the sides of the inner cover 5. The surface 58 of the inner cover 5 is substantially horizontal. In another embodiment, the surface 58 can be slanted or comprise any other geometry which directs water towards a tube 56 which is disposed in the surface of the inner cover. The tube 56 can be replaced with any other convenient water collection device, such as e.g. a bottle 8. The horizontal surface 58 collects water which drips down from the transparent outer cover 3 so that the surface 58 allows the clean water to flow to the water collection tube 56. The inner cover 5 further comprises a plurality of elevated apertures 50. In this embodiment, the apertures 50 are disposed in the top regions of semi-spheroids 59. Any elevation of the apertures 50 with respect to the surface 58 and the water collection tube 56 is in accordance with the present invention. The semi-spheroids can be replaced with e.g. pyramids, corrugated surfaces, cones, cylinders, or any other geometry.

Figure 11:
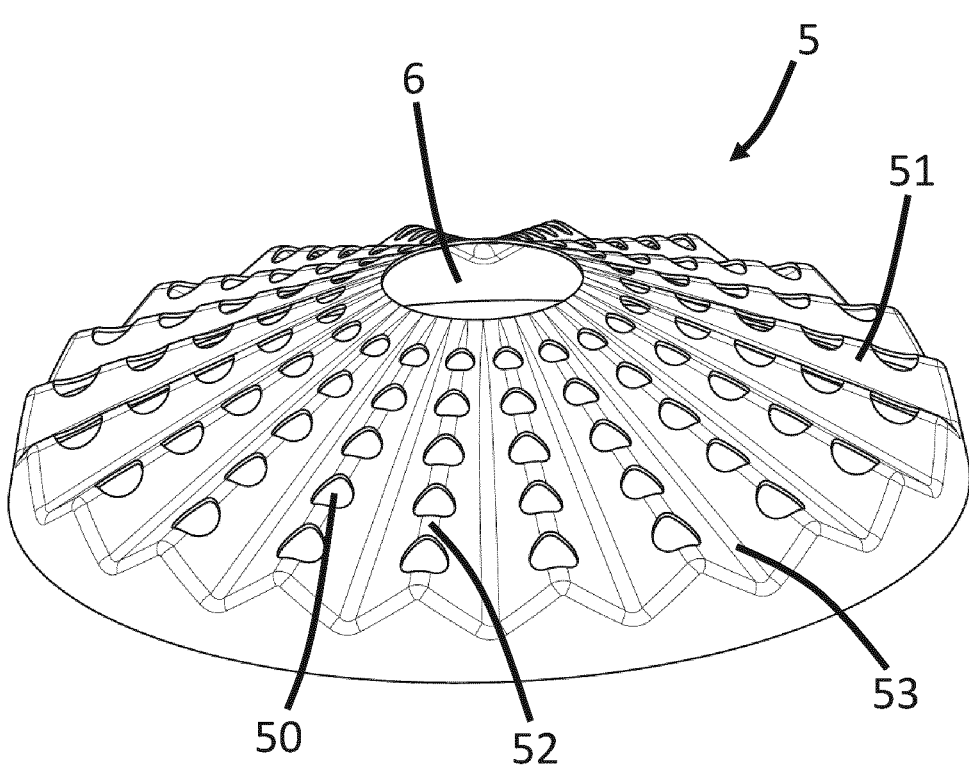
FIG. 11 is an angled top view of an embodiment in accordance with the invention showing the inner cover.

FIG. 11 is an angled top view of an embodiment in accordance with the invention showing the inner cover 5. The inner cover 5 of the FIG. 11 embodiment shows a corrugated surface 51, the corrugations having top portions 52 and bottom portions 53. The corrugated surface 51 is slanted to direct water to the periphery of the inner cover 5. The inner cover may be closed or may be open to comprise an opening 6 in the middle for receiving a plant, or the like. The apertures 50 are positioned on the top portions 52 of the corrugations 51 to prevent water from flowing back into the contaminated water source.

Figure 12:
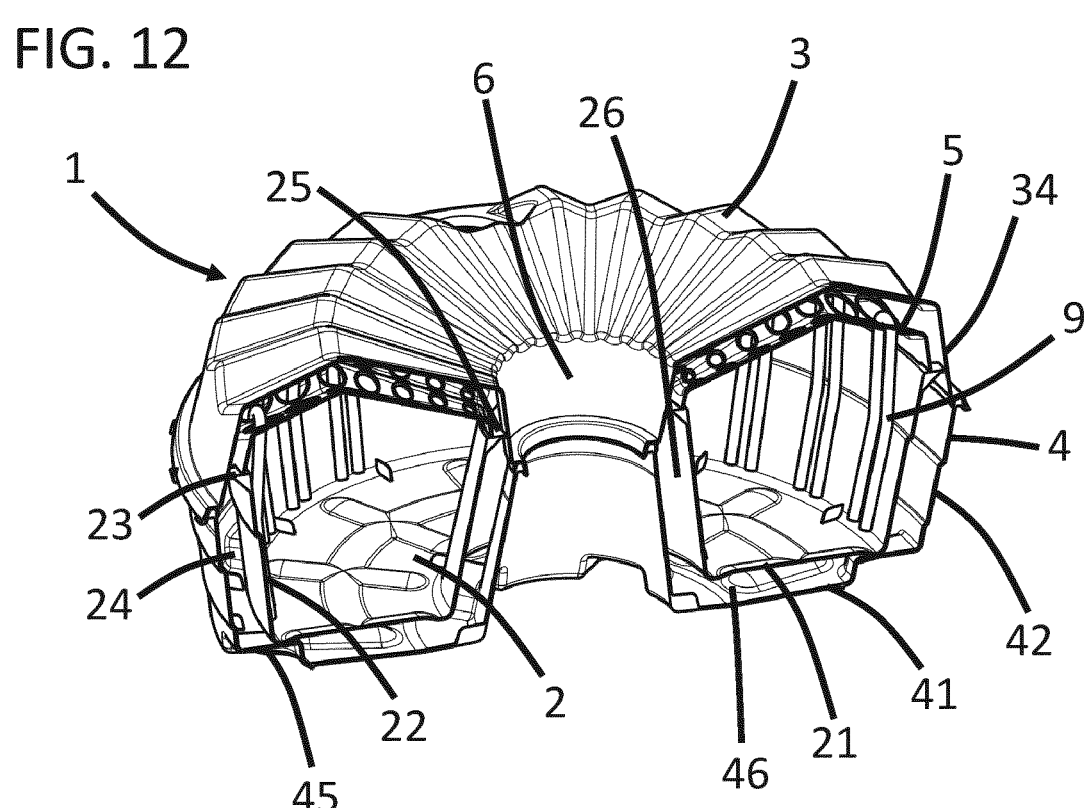
FIG. 12 is an angled top view of a cross section of a water distiller in accordance with an embodiment of the invention comprising evaporation means.

FIG. 12 is an angled top view of a cross section of a water distiller in accordance with a preferred embodiment of the invention comprising evaporation means. This embodiment is in essence the same as that of FIG. 1 and features already described for FIG. 1 will not be repeated here. FIG. 12 shows downwardly extending portion of outer cover 34 and that the upper edge of the first wall of the first container is higher than the upper edge of the outer wall of the outer container, thus exposing part of the first container to direct sunlight through the transparent outer and in particular also when the sun is low through downwardly extending portion of outer cover 34. Also visible are a plurality of capillary chords 9 that are suspended from the inner cover into the first container through the apertures in said inner cover. The outer spacers on first container 23 position the first container in contact with the outer cover and provide a set wall spacing 24 between outer container and first container cooperatively with the inner spacer 25 on the first container providing a wall spacing 26 between the inner upward extending walls of the central opening 6 in the outer container and first container. The indents 45 in the outer container form spacers setting bottom spacing 46 between the outer container and the first container.

Figure 13:
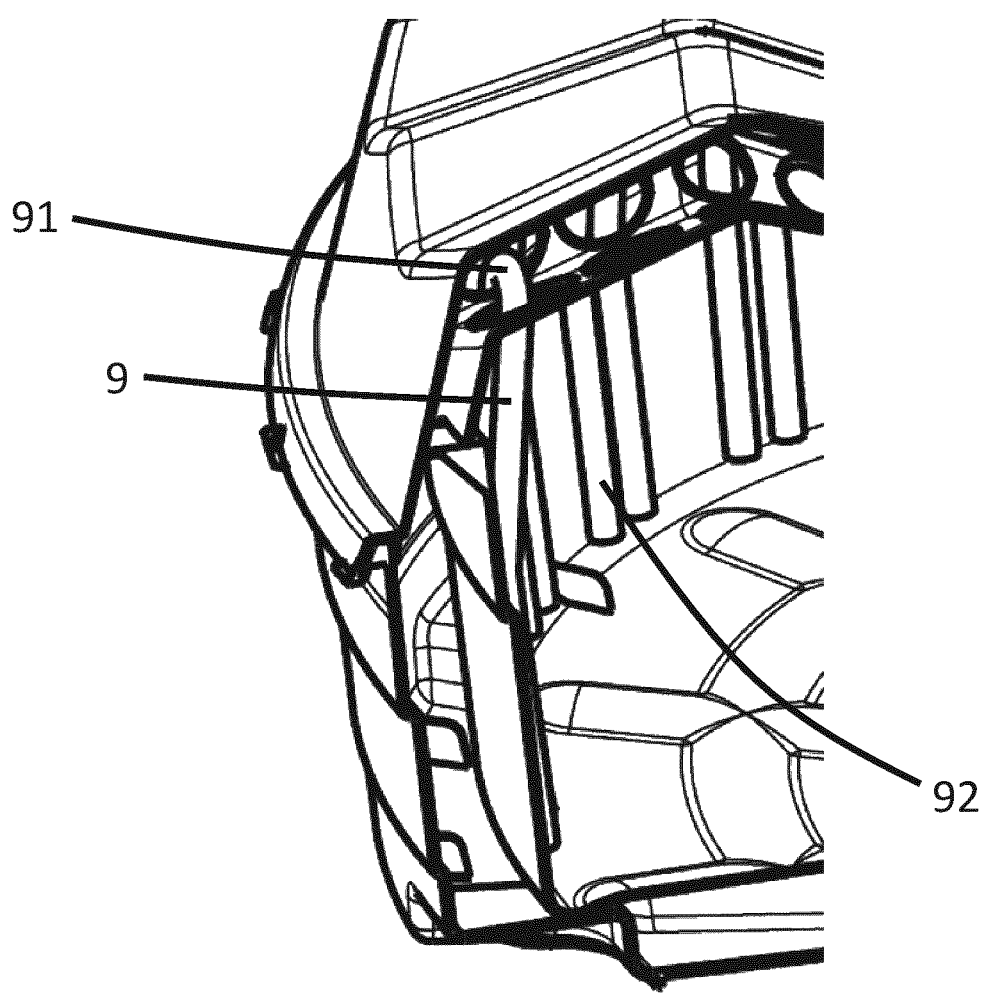
FIG. 13 is a zoomed-in cut-out from FIG. 12 showing the evaporation means suspended from the inner cover.

FIG. 13 is zoomed in cut out from FIG. 12, showing more clearly the evaporation means 9 suspended from the inner cover, showing that the capillary means extends over the upper surface of the inner cover through 2 apertures 50 in the inner cover having an upper end 91 above the upper surface of the inner cover and two ends 92 being suspended into the first container. Ultimately, capillary means can be provided from all apertures in the inner cover.

The invention also relates to a water distiller 1, for distilling contaminated water, the water distiller 1 comprising: a first container 2, for containing contaminated water, the first container 2 comprising a first base 21 and a first wall 22, upwardly extending from the first base 21; an outer cover 3 as in any of the embodiments described above and a water collection unit 4, wherein the outer cover 3 is transparent for heating the contaminated water in the first container 2 by sun radiation and wherein the first container 2 is provided with electrical heating means powered by solar energy for heating the contaminated water in the first container 2.

Thus, the invention has been described by reference to certain embodiments discussed above. It will be recognized that these embodiments are susceptible to various modifications and alternative forms well known to those of skill in the art.

Further modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A water distiller for distilling contaminated water, the water distiller comprising:
   a) a first container for containing contaminated water, the first container comprising a first base and a first wall upwardly extending from the first base;
   b) an outer cover;
   c) a water collection unit; and
   d) an inner cover for enclosing a volume in the first container, the inner cover comprising at least one aperture and being positioned below the outer cover,
   wherein the inner cover and the outer cover are designed for transporting condensed water to the water collection unit,
   wherein the outer cover is transparent for heating the contaminated water in the first container by sun radiation,
   wherein the water collection unit comprises an outer container for collecting distilled water, the outer container comprising an outer base and an outer wall upwardly extending from the outer base,
   wherein the first container is covered by the inner cover and is positioned inside the outer container,
   wherein the inner cover is opaque or in-transparent,
   wherein the outer container is covered and closed by the outer cover,
   wherein the inner cover is made of a water-impermeable material; and
   wherein the at least one aperture (i) is provided at an elevation relative to an adjacent portion of a surface of the inner cover, and/or (ii) is at least partially surround by a ridge.

2. The water distiller of claim 1, wherein at least a part of a surface area of the outer cover is slanted at an angle relative to a horizontal plane perpendicular to gravity, and at an angle relative to a horizontal plane of the first base of the first container or the outer base of the outer container, wherein the angle relative to the horizontal plane perpendicular to gravity is at least 10° and lower than 80°.

3. The water distiller of claim 1, wherein the outer cover comprises an outer corrugated surface comprising a plurality of outer corrugations, each of the outer corrugations comprising an upper portion and a bottom portion connected by a wall portion, said wall portions being disposed at angles between 20° and 70° relative to adjacent ones of the wall portions.

4. The water distiller of claim 1, wherein the inner cover comprises an upper surface and the outer cover comprises an inner surface, wherein at least part of the upper surface of the inner cover and/or at least part of the inner surface of the outer cover are water repellent by being made from a hydrophobic material or by being modified with a hydrophobic coating or a lotus leaf surface structure or combinations thereof.

5. The water distiller of claim 1, wherein the outer wall and the first wall are spaced apart by a wall spacing of 0.5 to 6 cm and wherein at least a part of the first base of the first container and the outer base of the outer container are spaced apart by a base spacing of at least 0.5 cm and less than 10 cm, wherein the spacings are set by spacers provided on the first container and/or on the outer container.

6. The water distiller of claim 1, wherein the first container comprises capillary means having a capillary function positioned inside the first container partially below and partially above an envisaged water level.

7. The water distiller of claim 1, wherein the outer wall of the outer container extends lower than the first wall of the first container by at least about 1 cm and/or wherein at least a top portion of the outer wall is transparent or wherein alternatively the entire outer container is transparent.

8. The water distiller of claim 1, having a circular or rectangular circumferential shape in horizontal cross-section, and having:
   a central opening configured to surround and protect a plant positioned therein, wherein the central opening is formed by an upwardly extending central first wall of the first container, or
   a recess in at least one side or corner wherein said recess forms part of an opening such that, in an assembly of two or more adjacent separate water distillers, the recesses cooperatively form an opening configured to surround and protect a plant positioned therein, wherein two or more adjacent water distillers in the assembly of two or more adjacent separate water distillers are connected by a coupling member.

9. The water distiller of claim 1, further comprising one or more of features a) to f), wherein features a) to f) are as follows:
   a) a closable drainage opening in the water collection unit for draining collected distilled water,
   b) an irrigation opening in the water collection unit,
   c) a filling opening extending through the outer cover and the inner cover into the first container and means to close the filling opening, said filling opening being positioned in the outer cover,
   d) an overflow duct or opening between the water collection unit and the first container,
   e) the outer cover is prepared from a transparent polymer material that is transparent for UV light, and
   f) an electrical heater for heating the contaminated water in the first container.

10. The water distiller of claim 1, wherein the inner cover has a thermal emissivity measured according to ASTM C1371-15 of at least about 0.50.

11. The water distiller of claim 6, wherein the capillary means are capillary cords, cloth or felt and are suspended from the inner cover into the first container.

12. The water distiller of claim 9, comprising an electrical heating means for heating the contaminated water in the first container, wherein the electrical heating means is a resistance heating element integrated in the first wall or first base of the first container or an immersion heater having an electrical resistance heating element encased in a tube positioned in the first container in the contaminated water to be heated.

13. The water distiller of claim 1, wherein the surface of the inner cover is a slanted surface, wherein the at least one aperture is positioned in an elevated region of the slanted surface of the inner cover.

14. A method of distilling water, comprising:

providing the water distiller of claim 1;

filling the first container with contaminated water;

exposing the water distiller to sunlight; and collecting distilled water from the water collection unit.

15. A water distiller for distilling contaminated water, the water distiller comprising:

a) a first container for containing contaminated water, the first container comprising a first base and a first wall upwardly extending from the first base;

b) an outer cover;

c) a water collection unit; and d) an inner cover for enclosing a volume in the first container, the inner cover comprising at least one aperture and being positioned below the outer cover, wherein the inner cover and the outer cover are designed for transporting condensed water to the water collection unit, wherein the outer cover is transparent for heating the contaminated water in the first container by sun radiation, wherein the water collection unit comprises an outer container for collecting distilled water, the outer container comprising an outer base and an outer wall upwardly extending from the outer base, wherein the first container is covered by the inner cover and is positioned inside the outer container, wherein the inner cover is opaque or in-transparent, wherein the outer container is covered and closed by the outer cover, and wherein the inner cover comprises an inner corrugated surface comprising a plurality of inner corrugations, each of the inner corrugations comprising an upper portion and a bottom portion connected by a wall portion, wherein the bottom portions of the inner corrugations are designed to channel condensed water towards the water collection unit, said wall portions being disposed at angles between 20° and 70° relative to adjacent ones of the wall portions.

16. The water distiller of claim 15, wherein the outer corrugations in the outer cover and the corrugations in the inner cover, have a triangular cross-sectional shape.

17. The water distiller of claim 15, wherein the at least one aperture is positioned on the upper portion of at least one of the inner corrugations.

18. A water distiller for distilling contaminated water, the water distiller comprising:

a) a first container for containing contaminated water, the first container comprising a first base and a first wall upwardly extending from the first base;

b) an outer cover;

c) a water collection unit; and d) an inner cover for enclosing a volume in the first container, the inner cover comprising at least one aperture and being positioned below the outer cover, wherein the inner cover and the outer cover are designed for transporting condensed water to the water collection unit, wherein the outer cover is transparent for heating the contaminated water in the first container by sun radiation, wherein the water collection unit comprises an outer container for collecting distilled water, the outer container comprising an outer base and an outer wall upwardly extending from the outer base, wherein the first container is covered by the inner cover and is positioned inside the outer container, wherein the inner cover is opaque or in-transparent, and wherein the outer container is covered and closed by the outer cover, and wherein the outer cover comprises a corrugated surface comprising a plurality of outer corrugations, each of the outer corrugations comprising an upper portion and a bottom portion connected by a wall portion, said wall portions being disposed at angles between 20° and 70° relative to adjacent ones of the wall portions, and the inner cover comprises a corrugated surface comprising a plurality of inner corrugations aligned with the outer corrugations of the outer cover such that the bottom portions of the outer corrugations of the outer cover align with bottom portions of the inner corrugations of the inner cover such that condensed water droplets falling from the bottom portions of the outer corrugations of the outer cover fall into the bottom portions of the inner corrugations of the inner cover.

* * * * *